United States Patent
Sasaki et al.

(10) Patent No.: US 9,713,021 B2
(45) Date of Patent: Jul. 18, 2017

(54) TRANSMISSION DEVICE, RECEPTION DEVICE, TRANSMISSION METHOD, AND RECEPTION METHOD

(71) Applicant: NEC Corporation, Tokyo (JP)

(72) Inventors: Shizen Sasaki, Tokyo (JP); Kengo Oketani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 96 days.

(21) Appl. No.: 14/407,671

(22) PCT Filed: Mar. 19, 2013

(86) PCT No.: PCT/JP2013/057809
§ 371 (c)(1),
(2) Date: Dec. 12, 2014

(87) PCT Pub. No.: WO2014/006936
PCT Pub. Date: Jan. 9, 2014

(65) Prior Publication Data
US 2015/0172937 A1    Jun. 18, 2015

(30) Foreign Application Priority Data

Jul. 2, 2012    (JP) .................................. 2012-148513

(51) Int. Cl.
| | | |
|---|---|---|
| H04W 24/04 | (2009.01) | |
| H04B 7/06 | (2006.01) | |
| H04B 7/0417 | (2017.01) | |
| H04L 1/00 | (2006.01) | |
| H04W 72/04 | (2009.01) | |
| H04W 76/02 | (2009.01) | |

(52) U.S. Cl.
CPC .......... *H04W 24/04* (2013.01); *H04B 7/0417* (2013.01); *H04B 7/0632* (2013.01); *H04B 7/0639* (2013.01); *H04L 1/0061* (2013.01); *H04W 72/0466* (2013.01); *H04W 76/02* (2013.01)

(58) Field of Classification Search
None
See application file for complete search history.

(56) References Cited

U.S. PATENT DOCUMENTS

2011/0038310 A1 *  2/2011  Chmiel ................ H04J 11/0069
                                                                 370/328

FOREIGN PATENT DOCUMENTS

| JP | 2010-135915 | 6/2010 |
|---|---|---|
| JP | 2011-518476 | 6/2011 |

(Continued)

OTHER PUBLICATIONS

Extened European Search Report—EP 13 81 3753—Jan. 27, 2016.

(Continued)

*Primary Examiner* — Chi H Pham
*Assistant Examiner* — Raul Rivas
(74) *Attorney, Agent, or Firm* — Young & Thompson

(57) ABSTRACT

A transmission device has a connecting unit that connects transmission data, of each of a plurality of serving cells, an adding unit that adds active state information indicating whether the state of each of the plurality of serving cells is active, to the connected transmission data to generate a transmission sequence, and a transmission unit that transmits the generated transmission sequence.

5 Claims, 8 Drawing Sheets

(56) References Cited

FOREIGN PATENT DOCUMENTS

| JP | 2011-250042 | 12/2011 |
| JP | 2012-506671 | 3/2012 |

OTHER PUBLICATIONS

Pantech: "On CSI ambiguity handling with activation/deactivation", 3GPP Draft; R1-111642, 3rd Generation Partnership Project (3GPP), Mobile Competence Centre ; 650. Route Des Lucioles: F-06921 Sophia-Antipolis Cedex, France, vol. RAN WG1, No. Barcelona, Spain; May 9, 2011, May 3, 2011 (May 3, 2011), XP050491278, [retrieved on May 3, 2011] *p. 1*.

Alcatel-Lucent Shanghai Bell Etal: "Multiple CSI Reports on PUCCH for DL CoMP", 3GPP Draft; R1-122489_Final, 3rg Generation Partnership Project (3GPP), Mobile Competence Centre; 650, Route Des Lucioles; F-06921 Sophia-Antipolis Cedex; France, vol. RAN WG1, no, Prague, Czech Republic: May 21, 2012-May 25, 2012, May 2, 2012 (May 12, 2012), XP050601062, [retrieved on May 12, 2012].

International Search Report, PCT/JP2013/057809, May 7, 2013.

ASUTeK, CSI, reporting and resource size considering activation status, 3GPP TSG RAN WG1 Meeting #65 R1-111524, May 13, 2011.

LG Electronics, Discussion on 'LS on CSI reporting and SCell deactivation', 3GPP TSG RAN WG1 #65 R1-111614, May 13, 2011.

Fujitsu, MAC CE for SCells (de) activation, 3GPP TSG-RAN WG2#71bis R2-105644, Oct. 15, 2010.

LG Electronics Inc., MAC CE Format for Scell Activation Deactivation, 3GPP TSG-RAN WG2#70bis R2-103934, Jul. 2, 2010.

3GPP TS 36.321 V10.4.0 (Dec. 2011), 3rd Generation Partnership Project; Technical Specification Group Radio Access Network; Evolved Universal Terrestrial Radio Access (E-UTRA); Medium Access Control (MAC) protocol specification (Release 10).

3GPP TS 36.213 V10.4.0 (Dec. 2011)M 3rd Generation Partnership Project; Technical Specification Group Radio Access Network; Evolved Universal Terrestrial Radio Access (E-UTRA); Physical layer procedures (Release 10).

3GPP TS 36.331 V10.4.0 (Dec. 2011), 3rd Generation Partnership Project; Technical Specification Group Radio Access Network; Evolved Universal Terrestrial Radio Access (E-UTRA); Radio Resource Control (RRC); Protocol specification (Release 10).

3GPP TS 36.212 V10.4.0 (Dec. 2011), 3rdGeneration partnership Project; Technical Specification Group Radio Access Network; Evolved Universal Terrestrial Radio Access (U-UTRA); Multiplexing and channel coding (Release 10).

\* cited by examiner

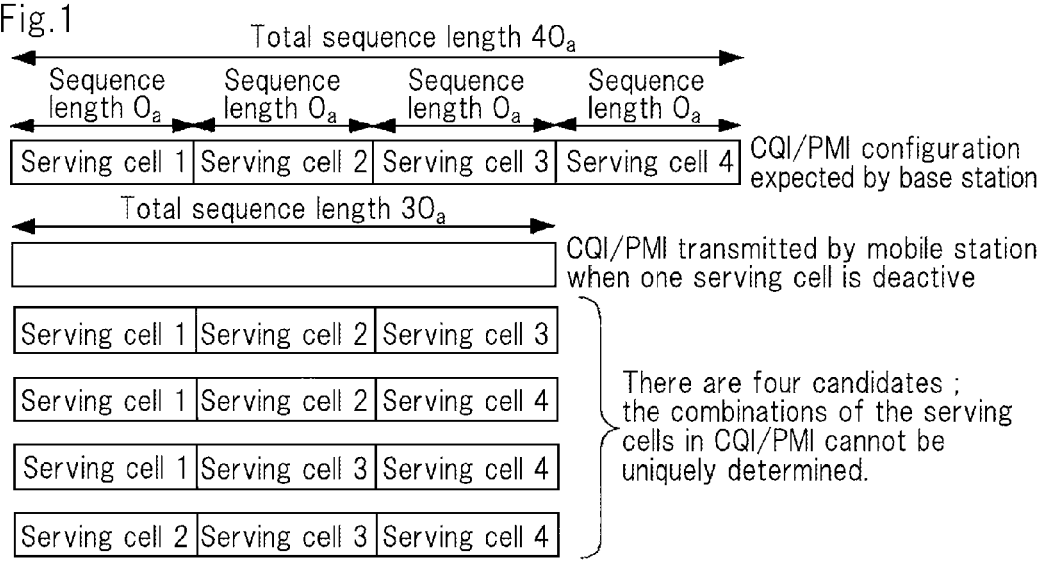
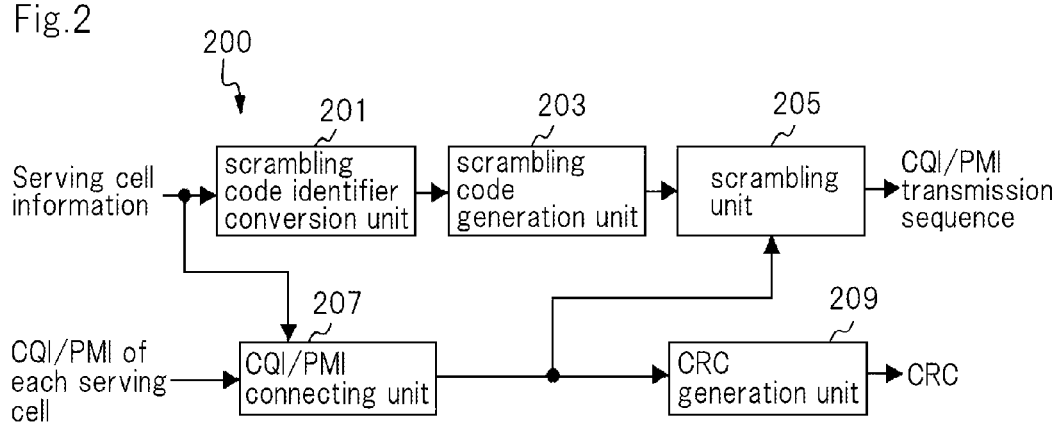
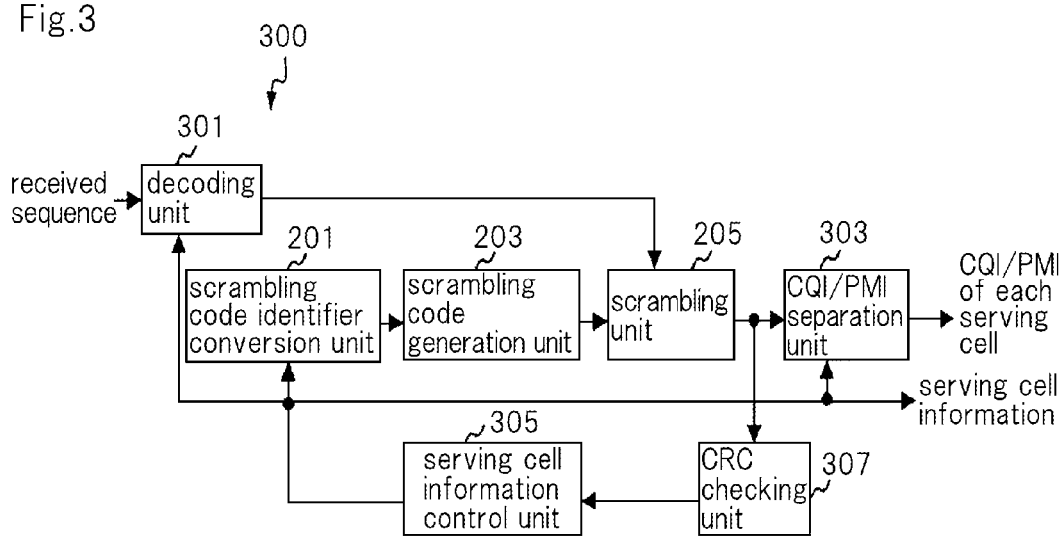

TRANSMISSION DEVICE, RECEPTION DEVICE, TRANSMISSION METHOD, AND RECEPTION METHOD

TECHNICAL FIELD

The present invention relates to a transmission device, a reception device, a transmission method and a reception method.

BACKGROUND ART

LTE-Advanced is generally known as a developed form of LTE (Long Term Evolution) that is a radio communication method prescribed by 3GPP (Third Generation Partnership Project).

In LTE-Advanced, the implementation of carrier aggregation is agreed upon. Carrier aggregation is a method in which a single mobile station carries out uplink or downlink communication by simultaneously using a plurality of carriers. Each of the plurality of carriers that is used at the time of carrier aggregation is referred to as a component carrier (CC).

Here, a cell that is connected to the mobile station and that can be used in communication is referred to as a serving cell. Among serving cells, the cell that is initially set when establishing a connection of the mobile station is the primary serving cell (PCell), and a cell that is set after establishing connection is referred to as a secondary serving cell (SCell).

According to Non-Patent Document 1, a mobile station is able to switch the state of each SCell between active state and inactive state. A mobile station does not carry out uplink communication using an SCell in the inactive state, and further, for such an SCell in inactive state, does not measure quality, does not report Channel State Information (CSI) to a base station, and does not monitor Physical Downlink Control Channels (PDCCH).

There are two methods, the following first method and second method, for switching an SCell in the active state to the inactive state.

In the first method, a base station transmits to a mobile station an MAC (Media Access Control) control element for causing deactivation. The mobile station, upon receiving the MAC control element that instructs deactivation of a particular SCell, causes the transition of the state of the SCell to the inactive state.

In the second method, no uplink or downlink communication resources that use PDCCH are allocated to a mobile station by the time of expiration of timers for each SCell in the mobile station. The mobile station similarly causes the state of a particular SCell to transition to the inactive state when there is no allocation of the above-described resources by the expiration of the timer for the particular SCell.

In the method of switching an SCell that is in the inactive state to the active state, a base station transmits a MAC control element that instructs activation. The mobile station, upon receiving the MAC control element that instructs the activation of a particular SCell, causes the transition of the state of the SCell to the active state.

The chief object of providing the above-described second method (deactivation resulting from expiration of timers) other than the above-described first method (transmission of MAC control information that instructs deactivation) is for the purpose of protection when the mobile station is unable to accurately receive the MAC control information that is transmitted in the above-described first method. In this case, the failure to accurately receive the MAC control information that instructs deactivation of a particular SCell results in the possibility that the base station and the mobile station will each have different perceptions such that the mobile station will continue to perceive the SCell as still in the active state whereas the base station will perceive the SCell as being in the inactive state. The above-described second method enables solving this problem, and according to the above-described second method, after the passage of a fixed time interval (the expiration of a timer), the disagreement in perception between the base station and the mobile station relating to the state of the SCell can be eliminated.

However, due to the existence of the above-described second method, a new problem arises in which "in the interval that the base station perceives the active state, the mobile station autonomously transitions to the inactive state, with the result that disagreement occurs between the perceptions of the base station and mobile station," as will next be explained. The mechanism of the occurrence of this phenomenon is next described more concretely.

Even if a base station uses PDCCH for a particular SCell and instructs the allocation of communication resources, the reception of PDCCH may fail due to the reception quality of the mobile station and communication resources may not be allocated to this SCell. As described hereinabove, when the allocation of communication resources does not succeed by the time of expiration of the timer of a mobile station, the mobile station switches the SCell to the inactive state. At this time, the base station perceives the same SCell as being in the active state, but because the mobile station perceives the inactive state, a disagreement in the perception of the state of the SCell arises.

However, according to Non-Patent Document 2, in Aperiodic CSI transmission, a mobile station is able to transmit a maximum of a 5-serving-cell portion of CSI on one serving cell. Here, CSI includes a channel quality indicator (CQI), a Pre-coding Matrix Indicator (PMI), and a Rank Indicator (RI).

According to Non-Patent Document 3, a unique serving cell index is given to each serving cell within a mobile station. In this case, the serving cell index of a PCell is always "0."

According to Non-Patent Document 4, the CQI/PMI and RI of each serving cell are each connected in the order of serving cell indices and transmitted on one serving cell. At this time, the CQI/PMI or RI of a serving cell in the inactive state is not connected.

In addition, according to Non-Patent Document 4, when the total number of bits of CQI/PMI that are connected as described hereinabove is 12 or more, an 8-bit Cyclic Redundancy Check (CRC) code is added to enable error detection. On the other hand, when the number of bits is 11 or less, a CRC code is not added and error detection is not possible.

LITERATURE OF THE PRIOR ART

Non-Patent Documents

Non-Patent Document 1: 3GPP, "3GPP TS36.321 v10.4.0," December 2011
Non-Patent Document 2: 3GPP, "3GPP TS36.213 v10.4.0," December 2011
Non-Patent Document 3: 3GPP, "3GPP TS36.331 v10.4.0," December 2011
Non-Patent Document 4: 3GPP, "3GPP TS36.212 v10.4.0," December 2011

SUMMARY OF THE INVENTION

Problem to be Solved by the Invention

When a disagreement in perception of the state of each serving cell arises between a base station and a mobile station, a disagreement in the perception regarding the total sequence length of CQI/PMI and RI will also arise between the base station and the mobile station.

In a configuration of the related art, an active state indicator that shows whether the state of each serving cell is active or deactive is not added to the connected CQI/PMI and RI itself. Accordingly, when the above-described disagreement in perception arises, the base station is required to determine the serving cell to which the CQI/PMI and RI are connected.

At this time, a CRC code was added if the number of bits of the connected CQI/PMI was 12 or more, and an error of the entire connected CQI/PMI could be detected on the base station side. However, in cases such as when the CQI/PMI sequence length of each serving cell is equal, among a plurality of serving cells, the serving cell to which the CQI/PMI was connected could not be identified by the base station.

As an example, a case is considered in which, as in FIG. 1, the sequence lengths of CQI/PMI in four serving cells are all equally $O_a$ and, due to the above-described disagreement in perception, transmitted lacking the CQI/PMI of one serving cell. In this case, at the base station, decoding is attempted assuming that the connected CQI/PMI sequence length is 4 $O_a$ based on the immediately preceding active state information of each serving cell. However, this assumed sequence length differs from the sequence length 3 $O_a$ that was actually transmitted, and the CRC check result is incorrect. It is next assumed that the CQI/PMI has been lost from one serving cell, and decoding attempted on the assumption that the connected CQI/PMI sequence length is 3 $O_a$. In this case, the sequence length itself matches the length that was actually transmitted, and as a result, the CRC check result is correct. However, although it is established that the connected CQI/PMI sequence length is 3 $O_a$, there are four candidates that are to be combined as serving cells to which the CQI/PMI are connected, and the combination cannot be identified. Accordingly, although it is ascertained in the base station that one serving cell is in the inactive state, it is not clear which serving cell is in the inactive state.

To summarize the discussion above, the first problem of the related configuration is that, in the event of a disagreement in perception between a base station and a mobile station regarding the state of each serving cell, the actual combination of serving cells represented by the CQI/PMI that are connected on the mobile station side cannot be uniquely identified on the base station side, and the connected CQI/PMI cannot be correctly separated for each serving cell. As a result, the CQI/PMI are discarded as indefinite information and communication resources are wasted.

The second problem of the related configuration is that the active state information of each serving cell cannot be clearly shared by the base station and mobile station. As a result, the state control and the allocation of communication resources by the base station are performed inefficiently based on erroneous serving cell states.

It is therefore an object of the present invention to provide a technology that is capable of solving any of the above-described problems.

Means for Solving the Problem

The transmission device according to the present invention includes:

a connecting unit that connects transmission data of each a plurality of serving cells;

an adding unit that adds active state information, which indicates whether the state of each of the plurality of serving cells is the active state, to the transmission data that were connected to generate a transmission sequence; and a transmission unit that transmits the transmission sequence that was generated.

The reception device of the present invention includes:

a reception unit that receives from a transmission device a transmission sequence in which the transmission data of each of a plurality of serving cells are connected, and active state information that indicates whether the state of each of the plurality of serving cells is the active state is added to the transmission data that were connected;

a restoration unit that restores the active state information of each of the plurality of serving cells based on the transmission sequence that was received; and a separation unit that, based on the active state information of each of the plurality of serving cells that were restored, separates transmission data of each of the plurality of serving cells from the transmission data that were connected.

The transmission method of the present invention is a transmission method realized by a transmission device and includes steps of:

connecting transmission data of each of a plurality of serving cells;

adding active state information, which indicates whether the state of each of the plurality of serving cells is the active state, to the transmission data that were connected to generate a transmission sequence; and transmitting the transmission sequence that was generated.

The reception method of the present invention is a reception method realized by a reception device and includes steps of:

receiving, from a transmission device, a transmission sequence in which transmission data of each of a plurality of serving cells are connected and to which active state information, which indicates whether the state of each of the plurality of serving cells is the active state, is added;

based on the transmission sequence that was received, restoring the active state information of each of the plurality of serving cells; and based on the active state information of each of the plurality of serving cells that were restored, separating the transmission data of each of the plurality of serving cells from the transmission data that were connected.

Effect of the Invention

According to the present invention, a transmission device adds active state information of each of a plurality of serving cells to transmission data that have been connected and transmits the result.

As a result, the effect is obtained in which a reception device, by restoring the active state information, is able to comprehend the state of each of the serving cells that was perceived by the transmission device, whereby the transmission data that were connected can be correctly separated for each serving cell.

BRIEF DESCRIPTION OF THE DRAWINGS

FIG. 1 is a view for describing the problems of the present invention.

FIG. 2 is a block diagram showing the configuration of the CQI/PMI generation unit of the first exemplary embodiment of the present invention.

FIG. 3 is a block diagram showing the configuration of the CQI/PMI decoding unit of the first exemplary embodiment of the present invention.

MODE FOR CARRYING OUT THE INVENTION

Figure 4:
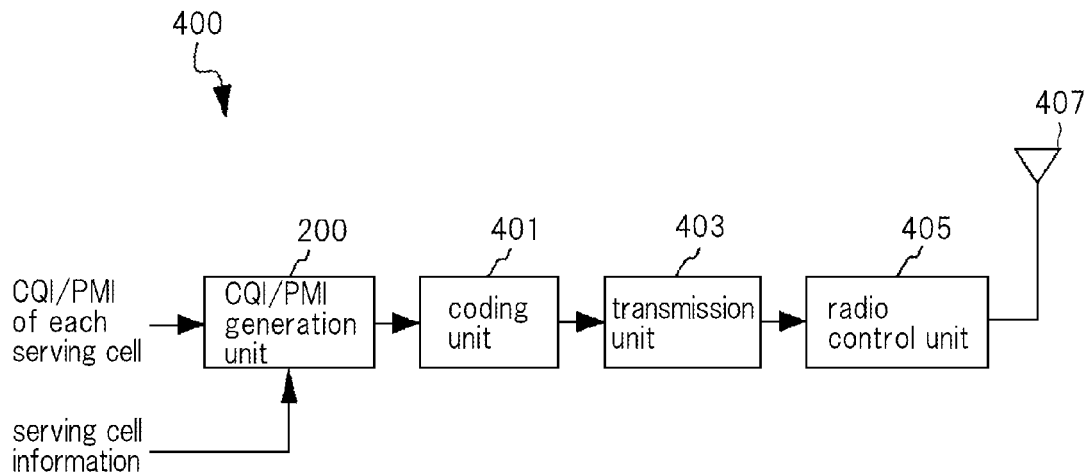
FIG. 4 is a block diagram showing the configuration of a mobile station of the first exemplary embodiment of the present invention.

Modes of carrying out the present invention are next described with reference to the accompanying drawings.

In the interest of simplification, active state information that indicates whether each state of a plurality of serving cells is the active state will be referred to as simply "serving cell information."

(1) First Exemplary Embodiment

FIG. 2 is a block diagram showing the configuration of CQI/PMI generation unit 200 of the first exemplary embodiment of the present invention. CQI/PMI generation unit 200 is provided in the transmission device (a mobile station in the present exemplary embodiment).

CQI/PMI generation unit 200 shown in FIG. 2 includes scrambling code identifier conversion unit 201, scrambling code generation unit 203, scrambling unit 205, CQI/PMI connecting unit 207, and CRC generation unit 209. In FIG. 2, the adding unit is made up of scrambling code identifier conversion unit 201, scrambling code generation unit 203 and scrambling unit 205.

Scrambling code identifier conversion unit 201 takes as input serving cell information that is held by the mobile station, converts the states of serving cells to scrambling code identifiers and supplies the output to scrambling code generation unit 203.

Scrambling code generation unit 203 takes as input the scrambling code identifiers that were supplied from scrambling code identifier conversion unit 201, generates scrambling codes and supplies the result to scrambling unit 205.

CQI/PMI connecting unit 207 takes as input the serving cell information and the CQI/PMI of each serving cell that is held by the mobile station; based on the serving cell information, connects the CQI/PMI of serving cells in the active state in the order of serving cell indices; and supplies the result to scrambling unit 205 and CRC generation unit 209.

CRC generation unit 209 takes as input the connected CQI/PMI that was supplied from CQI/PMI connecting unit 207 and generates and supplies CRC code.

Scrambling unit 205 takes as input the scrambling codes supplied from scrambling code generation unit 203 and the connected CQI/PMI that was supplied from CQI/PMI connecting unit 207, uses the scrambling codes to scramble the connected CQI/PMI, and supplies a CQI/PMI transmission sequence.

FIG. 3 is a block diagram showing the configuration of CQI/PMI decoding unit 300 of the first exemplary embodiment of the present invention. CQI/PMI decoding unit 300 is provided in the reception device (in the present exemplary embodiment, the base station).

CQI/PMI decoding unit 300 shown in FIG. 3 includes decoding unit 301, scrambling code identifier conversion unit 201, scrambling code generation unit 203, scrambling unit 205, CQI/PMI separation unit 303, serving cell information control unit 305, and CRC checking unit 307. In FIG. 3, the restoration unit is made up of decoding unit 301, scrambling code identifier conversion unit 201, serving cell information control unit 305, scrambling code generation unit 203, scrambling unit 205, serving cell information control unit 305, and CRC checking unit 307.

Decoding unit 301 takes as input a received sequence that is received from a mobile station (the CQI/PMI received sequence corresponding to the above-described CQI/PMI transmission sequence, or a CQI/PMI received sequence to which CRC code has been added) and serving cell information that is supplied from serving cell information control unit 305, and after calculating the sequence length of CQI/PMI in the received sequence based on serving cell information, decodes the CQI/PMI received sequence (or CQI/PMI received sequence to which CRC code has been added) and supplies the result to scrambling unit 205.

Scrambling code identifier conversion unit 201, scrambling code generation unit 203 and scrambling unit 205 have the same functions as the blocks to which the same reference numbers were given in FIG. 2.

In other words, scrambling code identifier conversion unit 201 takes as input the serving cell information that was supplied from serving cell information control unit 305, converts the states of the serving cells to scrambling code identifiers, and supplies the result to scrambling code generation unit 203.

Scrambling code generation unit 203 takes as input the scrambling code identifiers that were supplied from scrambling code identifier conversion unit 201, generates scrambling codes and supplies the result to scrambling unit 205.

Scrambling unit 205 takes as input the scrambling codes that were supplied from scrambling code generation unit 203 and the CQI/PMI received sequence (or CQI/PMI received sequence to which CRC code has been added) that was supplied from decoding unit 301, uses the scrambling codes to carry out scrambling of the CQI/PMI received sequence, and supplies candidates of the connected CQI/PMI sequence to CQI/PMI separation unit 303 and CRC checking unit 307. When CRC code has been added to the CQI/PMI received sequence, CRC code is added to the candidates of the connected CQI/PMI sequence supplied to CRC checking unit 307.

CQI/PMI separation unit 303 takes as input the candidates of the connected CQI/PMI sequence that was supplied from scrambling unit 205 and serving cell information that was supplied from serving cell information control unit 305, separates CQI/PMI of the serving cells in the active state in the order of serving cell indices from the candidates of the connected CQI/PMI sequence based on serving cell information, and supplies the CQI/PMI of each serving cell.

CRC checking unit 307 takes as input the candidates of the connected CQI/PMI sequence that was supplied from scrambling unit 205, carries out CRC checking of the candidates of the connected CQI/PMI sequence, and supplies the results of CRC checking to serving cell information control unit 305.

Serving cell information control unit 305 takes as input the CRC check results supplied from CRC checking unit 307, and based on the CRC check results, restores the serving cell information of the mobile station. More specifically, serving cell information control unit 305 successively changes the candidates of serving cell information until the CRC check results are correct and supplies the result, and takes the candidate of serving cell information at the time the CRC check result was correct as the restored serving cell information of the mobile station.

FIG. 4 is a block diagram showing the configuration of mobile station 400 of the first exemplary embodiment of the present invention.

Mobile station 400 shown in FIG. 4 includes CQI/PMI generation unit 200, coding unit 401, transmission unit 403, radio control unit 405 and antenna 407.

CQI/PMI generation unit 200 is a component in which CQI/PMI generation unit 200 of FIG. 2 is used in mobile station 400.

CQI/PMI generation unit 200 takes as input serving cell information and the CQI/PMI of each serving cell that is held by mobile station 400 and supplies CQI/PMI transmission sequences and CRC code to coding unit 401.

Because coding unit 401, transmission unit 403, radio control unit 405, and antenna 407 are well known to those in the art, and further, have no direct relation to the present invention, details of the configuration are omitted from the figures and explanation. In addition, other blocks that perform processes inherent to a mobile station are not characteristic parts of the present invention and are therefore omitted from FIG. 4.

Figure 5:
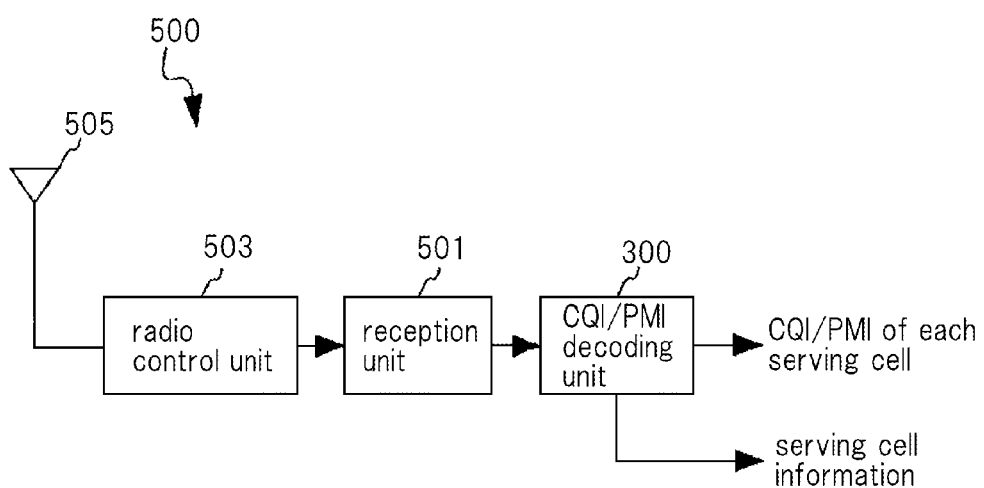
FIG. 5 is a block diagram showing the configuration of the base station of the first exemplary embodiment of the present invention.

FIG. 5 is a block diagram showing the configuration of base station 500 of the first exemplary embodiment of the present invention.

Base station 500 shown in FIG. 5 includes CQI/PMI decoding unit 300, reception unit 501, radio control unit 503 and antenna 505.

CQI/PMI decoding unit 300 is a component in which CQI/PMI decoding unit 300 of FIG. 3 is used in base station 500.

CQI/PMI decoding unit 300 takes as input the received sequence received from mobile station 400 and serving cell information that is held by base station 500 and supplies CQI/PMI of each serving cell and serving cell information.

Because reception unit 501, radio control unit 503, and antenna 505 are well known to those in the art, and further, have no direct relation to the present invention, detailed configuration is omitted from the figures and explanation. Other blocks that perform processes inherent to a base station are not characteristic parts of the present invention and are therefore also omitted from FIG. 5.

The operation of the present exemplary embodiment is next described.

The performance of scrambling of a CQI/PMI sequence is a characteristic feature of the present exemplary embodiment. Scrambling refers to obtaining a new sequence by taking the EXCLUSIVE-OR operation of a sequence and scrambling code. In this case, by subjecting the sequence that follows scrambling to scrambling that uses the same scrambling code, the original sequence is restored.

In the present exemplary embodiment, a connected CQI/PMI sequence is subjected to scrambling in mobile station 400 using a scrambling code that accords with the serving cell information. Because CRC code is calculated based on the CQI/PMI sequence that precedes scrambling, the CRC check result will be incorrect unless the same scrambling code is used in base station 500 to restore the original CQI/PMI sequence. Accordingly, when the CRC check result is correct, the serving cell information is seen as matching between base station 500 and mobile station 400.

Figure 6:
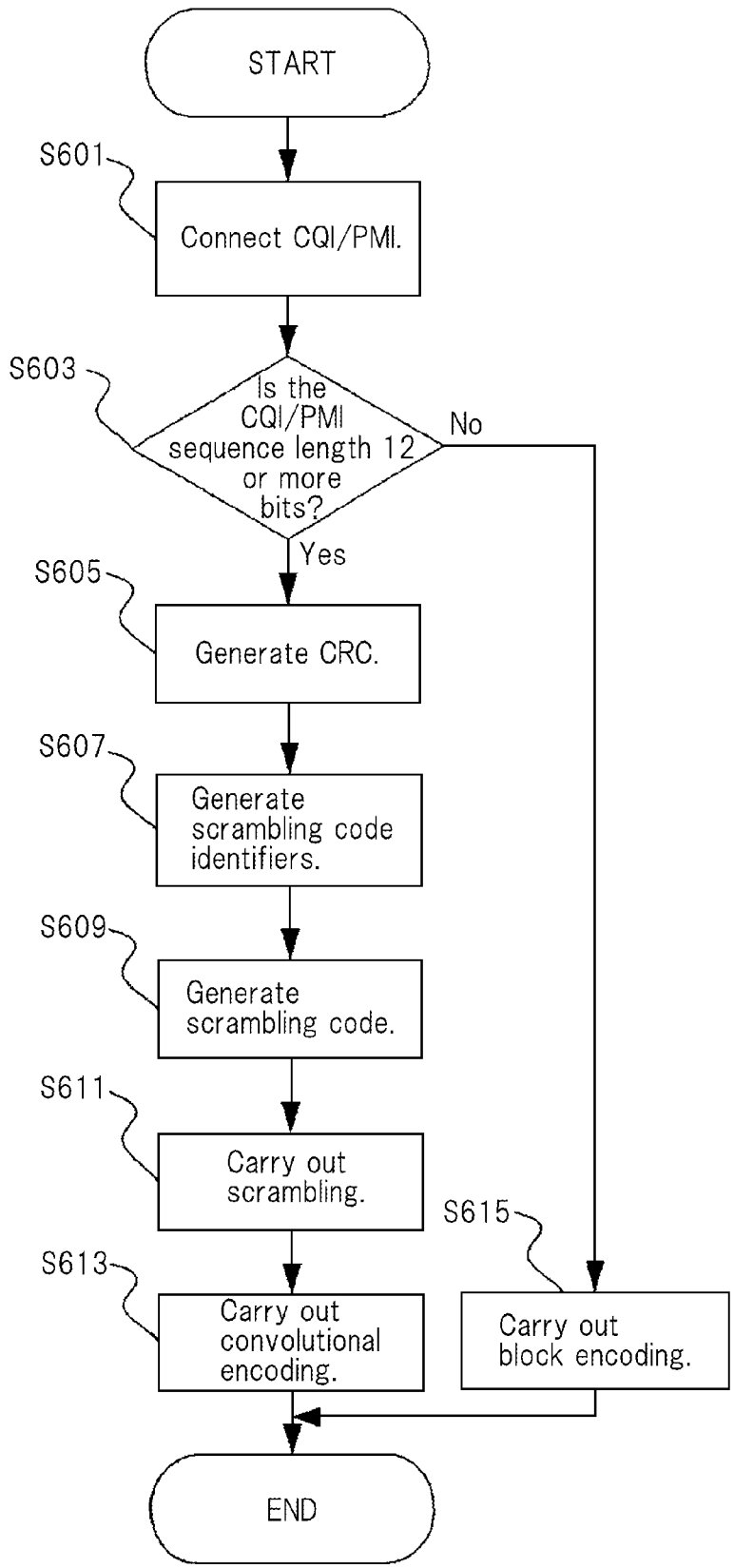
FIG. 6 is a flow chart for describing the CQI/PMI generation procedure in the mobile station of the first exemplary embodiment of the present invention.

FIG. 6 is a flow chart for describing the CQI/PMI generation procedure in mobile station 400 of the present exemplary embodiment.

As shown in FIG. 6, CQI/PMI connecting unit 207 first, in Step S601, determines serving cells in the active state based on the serving cell information held by mobile station 400 and then connects the CQI/PMI of serving cells in the active state in the order of serving cell indices. It is here assumed that when the CQI/PMI of a serving cell whose serving cell index is "n" is:

$$o_0^{(n)}, o_1^{(n)}, o_2^{(n)}, \ldots, o_{O_n-1}^{(n)} \qquad \text{[Formula 1]}$$

and when the serving cell indices of serving cells in the active state in the order of smaller values is:

$$\{a_0, a_1, a_2, \ldots, a_{N_A-1}\} \qquad \text{[Formula 2]}$$

the connected CQI/PMI sequence $o_x$ is represented as shown below.

$$O_0, O_1, O_2, \ldots, O_{O-1} = o_0^{(a_0)}, o_1^{(a_0)} o_2^{(a_0)}, \ldots, \qquad \text{[Formula 3]}$$
$$o_{a_0-1}^{(a_0)}, o_0^{(a_0)}, o_1^{(a_1)}, o_2^{(a_2)}, \ldots, o_{O_{a_1}-1}^{(a_0)}, \ldots ,$$
$$o_0^{(a_{N_A-1})}, o_1^{(a_{N_A-1})}, o_2^{(a_{N_A-1})}, \ldots o_{O_{a_{N_A-1}}-1}^{(a_{N_A-1})}$$

Here, $$O_{a_0}, O_{a_1}, O_{a_2}, \ldots, O_{a_{N_A-1}} \qquad \text{[Formula 4]}$$

represents the CQI/PMI sequence length of each serving cell, and O represents the sequence length of connected CQI/PMI.

In Step S603, a determination unit (not shown) next determines whether the sequence length of connected CQI/PMI sequence $o_x$ is 12 bits or more. This determination result is reported to each block in mobile station 400. This determination may be carried out by scrambling unit 205 or CRC generation unit 209.

If the sequence length is less than 12 bits, in Step S615, scrambling unit 205 simply supplies the connected CQI/PMI sequence $o_x$ without alteration and coding unit 401 carries out block-encoding of the connected CQI/PMI sequence $o_x$. On the other hand, if the sequence length is 12 bits or more, the following process is carried out.

In Step S605, CRC generation unit 209 first generates and supplies CRC code of 8 bits for the connected CQI/PMI sequence $o_x$.

Next, in Step S607, scrambling code identifier conversion unit 201 converts the serving cell information to scrambling code identifier $c_{scr}$ and determines $c_{scr}$. A scrambling code identifier is a parameter for generating scrambling code and is a value having a one-to-one correspondence with serving cell information. As an example, a case is considered in which the state a(n) of a serving cell for which the serving cell index is n is defined as shown below:

$$a(n) = \begin{cases} 1 & \text{if Serving Cell } n \text{ is active} \\ 0 & \text{otherwise} \end{cases}$$ [Formula 5]

Here, the identifier $c_{scr}$ of scrambling code can be defined, for example, as shown below:

$$c_{scr} = \sum_{n=1}^{N_{cell}-1} a(n) \cdot 2^{n-1}$$ [Formula 6]

Here, $N_{cell}$ represents the total number of serving cells. In this example, the state of each serving cell corresponds to each column of a binary number, and a unique identifier $c_{scr}$ of scrambling code is generated. Because a serving cell (PCell) whose serving cell index is "0" is always in the active state (a(0)=1), it is excluded from the calculation.

In Step S609, scrambling code generation unit 203 generates scrambling code c(x) that corresponds to scrambling code identifier $c_{scr}$. The scrambling code may also be code in which a different sequence corresponds to a different scrambling code identifier. However, from the standpoint of error-proofing, a code that has a large intercode distance between selectable scrambling codes is preferable. Examples of sequences having this property include an M sequence, Gold sequence, Reed-Muller code, and Hadamard code. An example of the generation of scrambling code using an M sequence is presented below as an example.

$$c(x+N) = \left(\sum_{u=0}^{N_m-1} c(x+y_u)\right) \bmod 2,$$ [Formula 7]

$$0 \le y_u < N,$$

$$0 \le N_m < N$$

$$c_{scr} = \sum_{i=0}^{N-1} c(i) \cdot 2^i$$

where N is an adjustable parameter that represents the number of shift steps of scrambling code generation unit 203 and the scrambling code period is $2^N-1$.

$$y_0, y_1, \ldots, y_{N_m-1}$$ [Formula 8]

is an adjustable parameter that determines the generating polynomial of an M sequence, and is selected such that the generating polynomial becomes a primitive polynomial. Here, $N_m$ represents the number of terms of the generating polynomial. In this example, scrambling code identifier $c_{scr}$ is set to the initial output of the scrambling code, and a unique sequence is generated for $c_{scr}$.

In Step S611, scrambling unit 205 next uses scrambling code c(x) to carry out scrambling of the connected CQI/PMI sequence $o_x$ and supplies the following CQI/PMI transmission sequence $o_x'$.

$$o_x' = (o_x + c(x)) \bmod 2$$ [Formula 9]

Finally, in Step S613, coding unit 401 adds CRC code to CQI/PMI transmission sequence $o_x'$ and carries out convolutional encoding.

The sequence that was encoded in Step S613 or S615 is then transmitted to base station 500 by way of transmission unit 403, radio control unit 405 and antenna 407.

Figure 7:
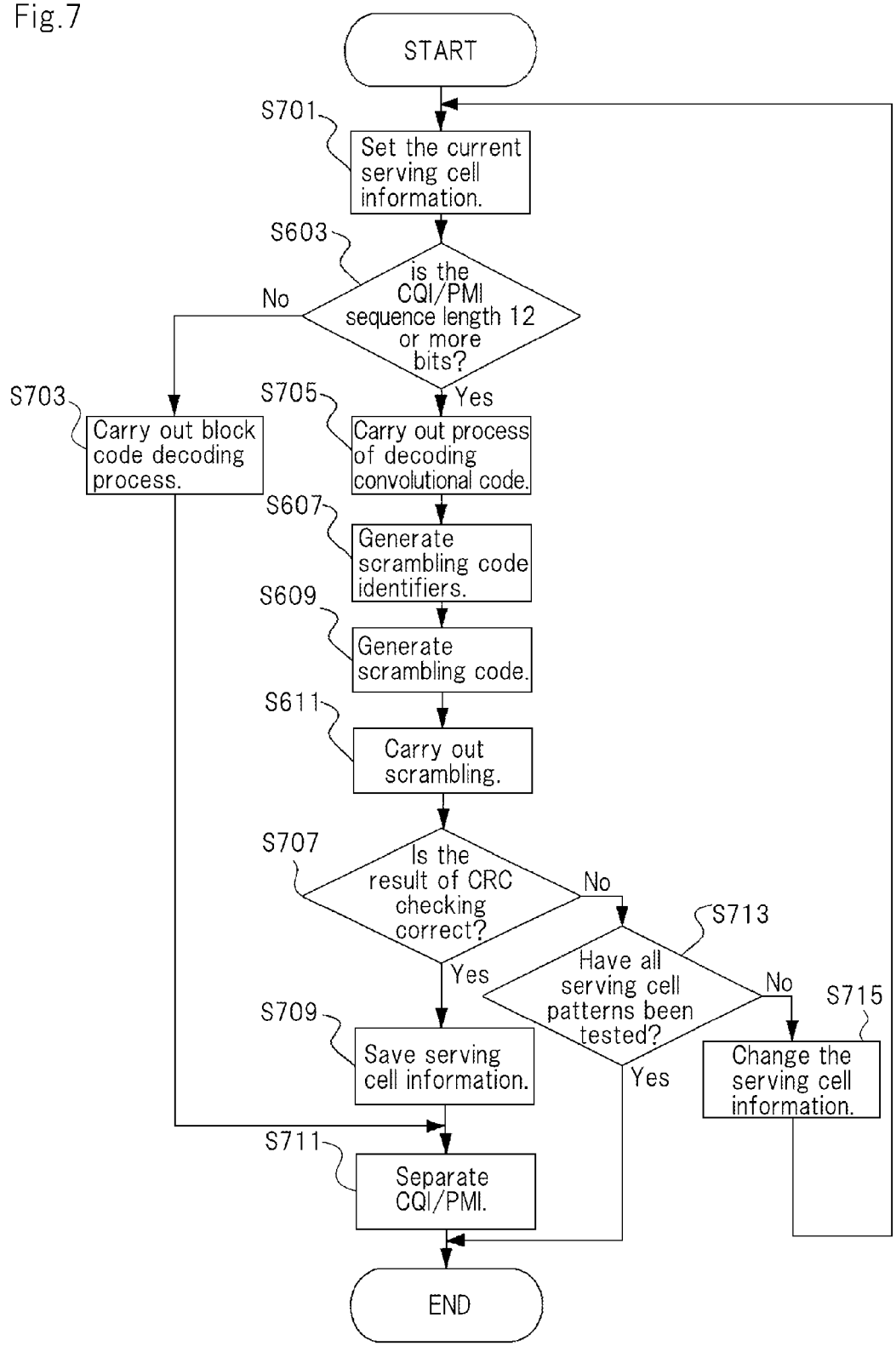
FIG. 7 is a flow chart for describing the CQI/PMI decoding procedure in the base station of the first exemplary embodiment of the present invention.

FIG. 7 is a flow chart for describing the CQI/PMI decoding procedure in base station 500 of the present exemplary embodiment. In FIG. 7, it is assumed that the sequence that was encoded in mobile station 400 by the method of FIG. 6 and transmitted is received as a received sequence in reception unit 501. In addition, in FIG. 7, the same reference numbers are given to the steps that are the same as in FIG. 6.

As shown in FIG. 7, in Step S701, serving cell information control unit 305 first saves serving cell information b(n) within mobile station 400 that is held by base station 500 as temporary variable $a^{temp}(n)$.

In Step S603, decoding unit 301 next determines the sequence length $O^{temp}$ of the connected CQI/PMI sequence based on $a^{temp}(n)$ and judges whether the sequence length is 12 bits or more. The result of this judgment is reported to each block within base station 500.

If the sequence length $O^{temp}$ is less than 12 bits, decoding unit 301 carries out a decoding process of the received sequence that is block code in Step S703, and in Step S711, CQI/PMI separation unit 303 based on $a^{temp}(n)$ separates the CQI/PMI of the serving cells inactive state in the order of serving cell indices and supplies the CQI/PMI of each serving cell. On the other hand, if the sequence length $O^{temp}$ is equal to or greater than 12 bits, the following process is carried out.

First, in Step S705, decoding unit 301 carries out a decoding process of the received sequence that is convolutional code. The decoded CQI/PMI sequence is hereupon supplied to scrambling unit 205.

In Step S607, scrambling code identifier conversion unit 201 next, based on $a^{temp}(n)$, determines the scrambling code identifier:

$$c_{scr}^{temp}$$ [Formula 10]

by means of Formula 6.

In Step S609, scrambling code generation unit 203 next generates scrambling code by means of Formula 7.

In Step S611, scrambling unit 205 next carries out scrambling of the decoded sequence:

$$o_x'^{temp}$$ [Formula 11]

and generates the connected CQI/PMI sequence candidate:

$$o_x^{temp}$$ [Formula 12]

In Step S707, CRC checking unit 307 next carries out a CRC check of the connected CQI/PMI sequence candidate:

$$o_x^{temp}$$ [Formula 13]

If the CRC check result is correct, the sequence length of the connected CQI/PMI sequence is correct ($O^{temp}=0$), and it can be judged that the scrambling code identifier matches with the value used in mobile station 400:

$$(c_{scr}^{temp} = c_{scr})$$ [Formula 14]

The scrambling code identifier uniquely corresponds with the serving cell information as in Formula 6, whereby it can be confirmed that the perceptions of the serving cell information coincide ($a^{temp}(n)=a(n)$) between base station 500 and mobile station 400. In this case, serving cell information control unit 305 in Step S709 saves $a^{temp}(n)$ as serving cell information b(n) that is held by the base station, updates b(n), and reports this action to CQI/PMI separation unit 303. Finally, in Step S711, CQI/PMI separation unit 303, based on b(n) that follows updating, separates CQI/PMI of each serving cell from the connected CQI/PMI sequence candidate in the order of the serving cell indices:

$$o_x^{temp} \quad \text{[Formula 15]}$$

and supplies as output the CQI/PMI of each serving cell.

On the other hand, when the CRC check result is incorrect, serving cell information control unit 305 in Step S713 judges whether or not all patterns of the serving cells that have been set in advance have been tested. If all patterns have been tested, the CQI/PMI decoding process ends without obtaining the correct CQI/PMI. If there are still untested patterns, serving cell information control unit 305 alters temporary serving cell information $a^{temp}(n)$ and again carries out the processes of Step S701 and succeeding steps. One example that can be offered as an alteration of $a^{temp}(n)$, one serving cell in the active state in $a^{temp}(n)$ is temporarily altered to the inactive state.

In the present exemplary embodiment as described hereinabove, mobile station 400 adds serving cell information to connected CQI/PMI by using a scrambling code that accords with serving cell information to carry out scrambling.

As a result, base station 500, by restoring the serving cell information, is able to comprehend the state of each serving cell that was perceived by mobile station 400, whereby the effect is obtained in which the connected CQI/PMI can be separated correctly for each serving cell. As a result, CQI/PMI that was discarded as indefinite information in the related configuration can be newly used, and communication resources can be efficiently utilized.

In addition, the effect is obtained in which the active state information of each serving cell can be clearly shared between base station 500 and mobile station 400. As a result, the control of active states and the allocation of communication resources by base station 500 can be carried out efficiently based on the correct states of serving cells.

Finally, because scrambling is used as the method of adding serving cell information, the effect is obtained that serving cell information can be added without increasing the CQI/PMI sequence length.

(2) Second Exemplary Embodiment

In the first exemplary embodiment, scrambling was used as the method of adding serving cell information, but in the present exemplary embodiment, cyclic shifting is used.

After the generation of CRC code, mobile station 400 converts the serving cell information to a cyclic shift amount and then carries out cyclic shifting of connected CQI/PMI in accordance with the cyclic shift amount.

Base station 500 carries out reverse cyclic shifting such that the CRC check result is correct and obtains the serving cell information of mobile station 400 from the cyclic shift amount at the time when the CRC check result became correct.

Figure 8:
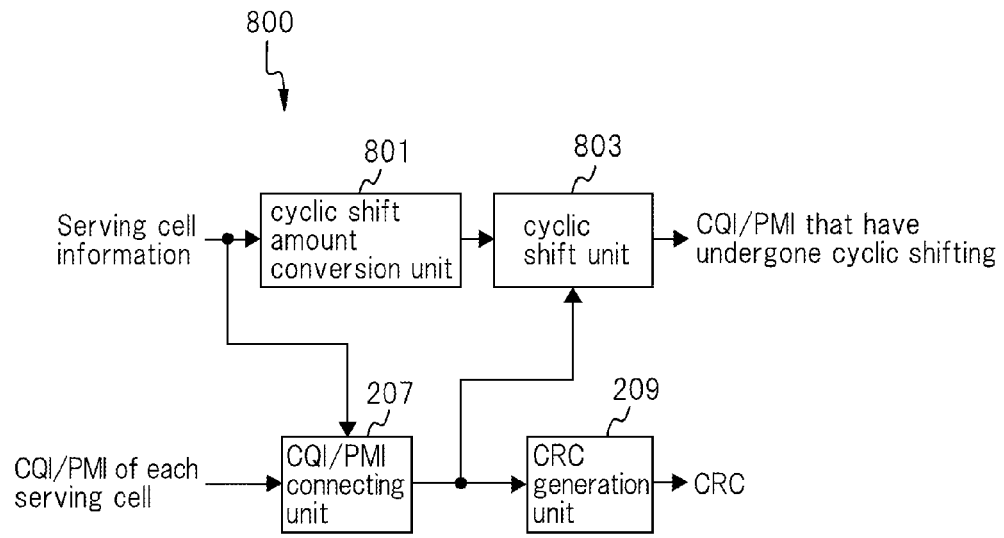
FIG. 8 is a block diagram showing the configuration of the CQI/PMI generation unit of the second exemplary embodiment of the present invention.
Figure 9:
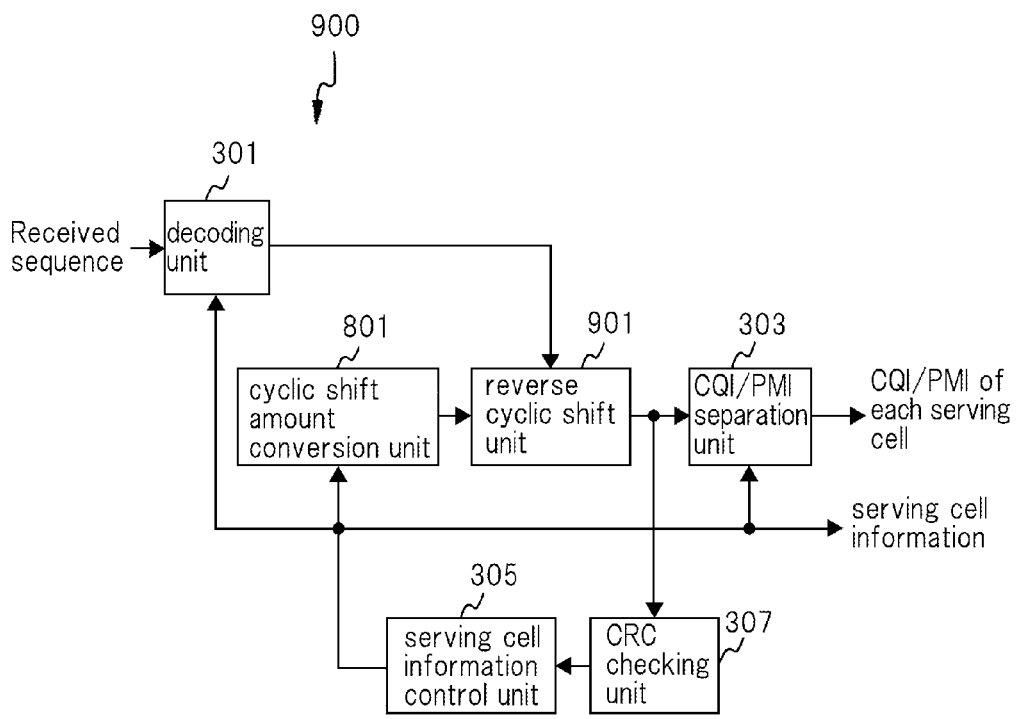
FIG. 9 is a block diagram showing the configuration of the CQI/PMI decoding unit of the second exemplary embodiment of the present invention.

FIG. 8 and FIG. 9 are block diagrams showing the configurations of CQI/PMI generation unit 800 and CQI/PMI decoding unit 900, respectively, of the second exemplary embodiment of the present invention.

CQI/PMI generation unit 800 shown in FIG. 8 is of a configuration in which CQI/PMI generation unit 200 of the first exemplary embodiment shown in FIG. 2 is modified by replacing scrambling code identifier conversion unit 201, scrambling code generation unit 203, and scrambling unit 205 with cyclic shift amount conversion unit 801 and cyclic shift unit 803. In FIG. 8, adding unit is made up of cyclic shift amount conversion unit 801 and cyclic shift unit 803.

CQI/PMI decoding unit 900 shown in FIG. 9 is of a configuration in which CQI/PMI decoding unit 300 of the first exemplary embodiment shown in FIG. 3 is modified by replacing scrambling code identifier conversion unit 201, scrambling code generation unit 203, and scrambling unit 205 by cyclic shift amount conversion unit 801 and reverse cyclic shift unit 901. In FIG. 9, the restoration unit is made up of decoding unit 301, cyclic shift amount conversion unit 801, reverse cyclic shift unit 901, serving cell information control unit 305, and CRC checking unit 307.

In other words, CQI/PMI generation unit 800 and CQI/PMI decoding unit 900 of the present exemplary embodiment differ from CQI/PMI generation unit 200 and CQI/PMI decoding unit 300 of the first exemplary embodiment in that the value for converting serving cell information is changed from the scrambling code identifier to the cyclic shift amount and in that the scrambling process is replaced by the cyclic shifting process.

In the present exemplary embodiment, the scrambling code identifier $c_{scr}$ in the first exemplary embodiment is thus replaced by the cyclic shift amount $c_{cs}$.

In the present exemplary embodiment, moreover, the configurations of base station 500 and mobile station 400 are the same as in the first exemplary embodiment (refer to FIG. 4 and FIG. 5).

The operation of the present exemplary embodiment is next described.

Figure 10:
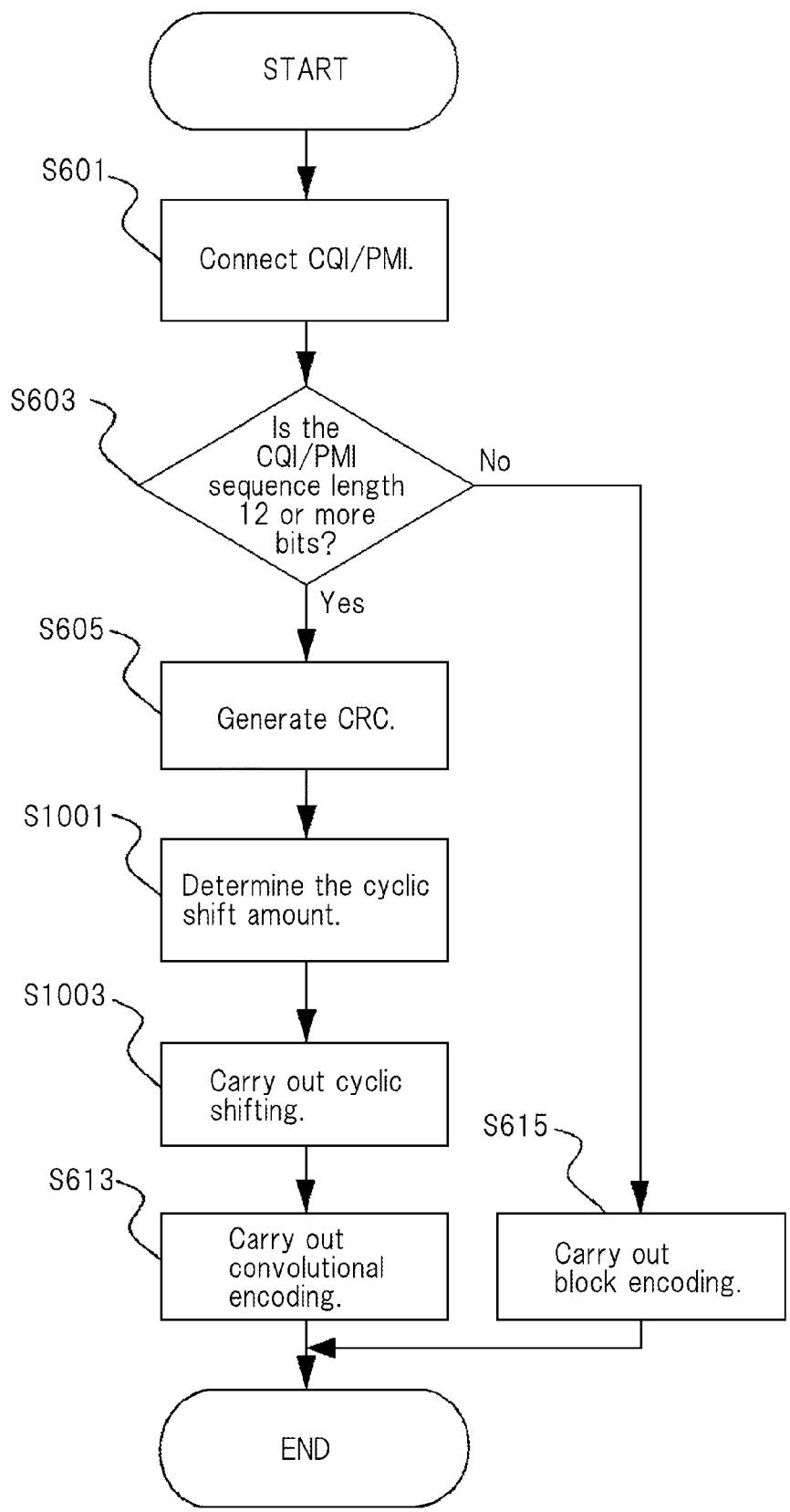
FIG. 10 is a flow chart for describing the CQI/PMI generation procedure in the mobile station of the second exemplary embodiment of the present invention.

FIG. 10 is a flow chart for describing the CQI/PMI generation procedure in mobile station 400 of the present exemplary embodiment. In FIG. 10, steps identical to steps in FIG. 6 are given the same reference numbers.

As shown in FIG. 10, in Step S1001, cyclic shift amount conversion unit 801 converts the serving cell information to the cyclic shift amount $c_{cs}$ and determines $c_{cs}$, and in Step S1003, cyclic shift unit 803, in accordance with the cyclic shift amount $c_{cs}$, carries out cyclic shifting of the connected CQI/PMI sequence:

$$o_0, o_1, \ldots, o_{O-1} \quad \text{[Formula 16]}$$

as shown below:

$$o_x' = x_{(x-c_{cs}) \bmod O} \quad \text{[Formula 17]}$$

and supplies CQI/PMI transmission sequence $o_x'$.

Figure 11:
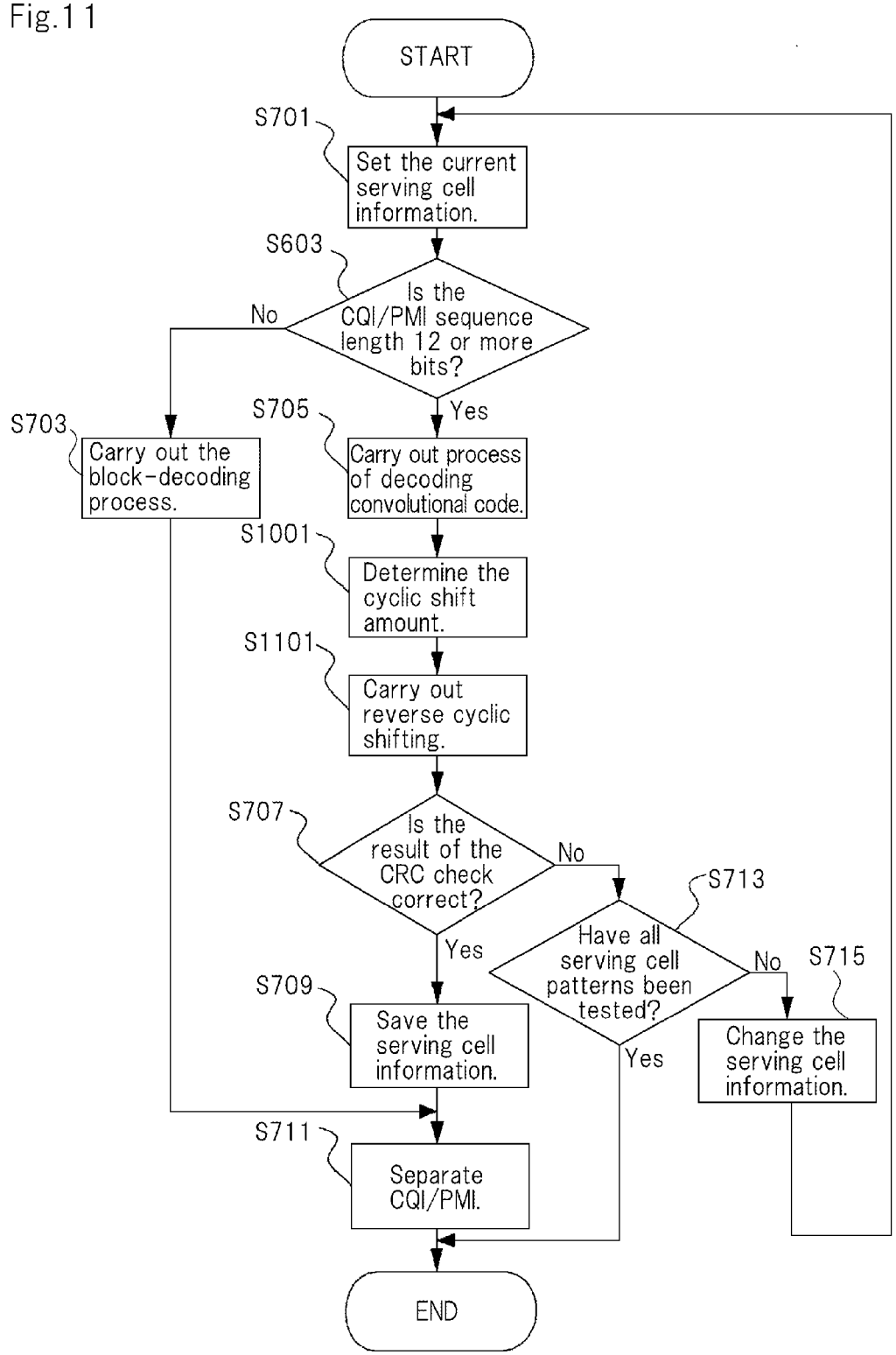
FIG. 11 is a flow chart for describing the CQI/PMI decoding procedure in the base station of the second exemplary embodiment of the present invention.

FIG. 11 is a flow chart for describing the CQI/PMI restoration procedure in base station 500 of the present exemplary embodiment. In FIG. 11, steps that are identical to steps in FIG. 7 are given the same reference numbers.

As shown in FIG. 11, reverse cyclic shift unit 901 in Step S1101, in accordance with the cyclic shift amount:

$$c_{sc}^{temp} \quad \text{[Formula 18]}$$

carries out reverse cyclic shifting of the decoded CQI/PMI sequence:

$$o_0^{temp}, o_1^{temp}, \ldots, o_{O^{temp}-1}^{temp} \quad \text{[Formula 19]}$$

as shown below to supply as output the connected CQI/PMI sequence candidate:

$$O_x^{temp} = O_{(x+c_{cs}^{temp}) \mod O^{temp}}^{\prime temp}$$ [Formula 20]

In this case as well, the condition by which the CRC check result of:

$$o_x^{temp}$$ [Formula 21]

is correct is limited to $O^{temp}=O$, and moreover:

$$c_{cs}^{temp} = c_{cs}$$ [Formula 22]

and as in the first exemplary embodiment, serving cell information a(n) of mobile station 400 can be restored based on:

$$c_{cs}^{temp}$$ [Formula 23]

The effect of the present exemplary embodiment is similar to that of the first exemplary embodiment.

(3) Third Exemplary Embodiment

Figure 12:
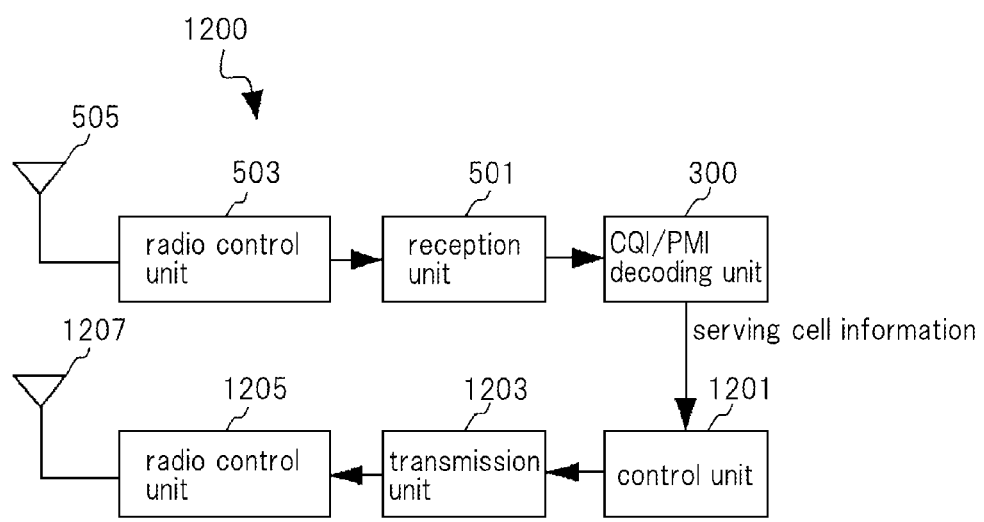
FIG. 12 is a block diagram showing the configuration of the base station of the third exemplary embodiment of the present invention.

FIG. 12 is a block diagram showing the configuration of base station 1200 of the third exemplary embodiment of the present invention.

In the present exemplary embodiment, base station 1200 represents more specifically a configuration that, based on serving cell information, carries out active state control of mobile station 400.

Base station 1200 shown in FIG. 12 is of a configuration in which control unit 1201, transmission unit 1203, radio control unit 1205, and antenna 1207 are added to base station 500 of the first and second exemplary embodiments shown in FIG. 5.

Control unit 1201 determines based on the serving cell information that was received as input from CQI/PMI decoding unit 300 whether to activate or deactivate mobile station 400 and supplies the determination result to transmission unit 1203.

Based on the determination result that was received from control unit 1201, transmission unit 1203 transmits active state control information that instructs activation or deactivation to mobile station 400. For example, the active state control information may be transmitted using a MAC Control Element or may be transmitted using a Layer3 message.

In the present exemplary embodiment as described hereinabove, the effect is obtained in which base station 1200, based on the correct serving cell states, is able to efficiently carry out active state control of mobile station 400.

The other effects of the present exemplary embodiment are similar to those of the first exemplary embodiment.

Although the present invention has been described with reference to exemplary embodiments, the present invention is not limited to the above-described exemplary embodiments. The configuration and details of the present invention are open to various modifications within the scope of the present invention that will be clear to one of ordinary skill in the art.

For example, in the above-described exemplary embodiments, serving cell information was added to a connected CQI/PMI sequence by implementing scrambling or cyclic shifting, but the present invention is not limited to these forms, and the serving cell information may also be connected to the beginning or end of a CQI/PMI sequence as independent information bits.

Although a connected CQI/PMI sequence was subjected to scrambling or cyclic shifting in the above-described exemplary embodiments, the present invention is not limited to these forms, and these processes may be carried out upon CRC instead of upon a connected CQI/PMI sequence.

In addition, although serving cell information was added to CQI/PMI in the above-described exemplary embodiments, the present invention is not limited to this form, and serving cell information may be added to other transmission data to which CRC code is added such as PUSCH (Physical Uplink Shared Channel), transport blocks, PDSCH (Physical Downlink Shared Channel), and PDCCH transmission data. In this case, either a base station or a mobile station may be the transmission device or the reception device. In this case, indefiniteness of all of the transmission data of a plurality of connected serving cells can be clearly resolved.

This application claims the benefits of priority based on Japanese Patent Application No. 2012-148513 for which application was submitted on Jul. 2, 2012 and incorporates by citation all of the disclosures of that application.

What is claimed is:

1. A transmission device comprising:
  a transmission sequence generation device comprising a cell information input that receives serving cell information from each of a plurality of serving cells, a transmission data input that receives transmission data of each of the plurality of serving cells, and a transmission sequence output, wherein the transmission sequence generation device is configured to operate as:
  i) a connecting unit that, using the serving cell information of each of the plurality of serving cells received from the cell information data input, connects together the transmission data of each of the plurality of serving cells received from the transmission data input;
  ii) an adding unit that i) receives the transmission data by the connecting unit, and the serving cell information of each of the plurality of serving cells received from the cell information data input, and ii) using the serving cell information of each of the plurality of serving cells received from the cell information data input, adds active state information that indicates whether the state of each of said plurality of serving cells is an active state, to said transmission data that were connected, to generate a transmission sequence, wherein said adding unit comprises:
    a conversion unit that converts active state information of each of said plurality of serving cells to a cyclic shift amount; and
    a cyclic shift unit that carries out cyclic shifting of said transmission data that were connected in accordance with said cyclic shift amount that was converted to generate the transmission sequence; and
  iii) a transmission unit with an input connected to the transmission sequence output to receive the generated transmission sequence, the transmission unit transmitting said generated transmission sequence at the transmission sequence output.

2. A reception device comprising:
  a reception device comprising a transmission sequence input for receiving a transmission sequence of transmission data from a transmission device, and transmission data output, wherein the reception device is configured to operate as:
  i) a reception unit that receives from a transmission device a transmission sequence in which transmission data of each of a plurality of serving cells are connected and active state information that indicates whether the state of each of said plurality of serving cells is the active state is added to said transmission data that were connected, wherein said transmission sequence is realized by carrying out cyclic shifting of said connected transmission data that were connected in accordance with a cyclic shift amount obtained by converting active state information of each of said plurality of serving cells, and moreover, said transmission sequence is realized by adding CRC code to said transmission data that were connected;

ii) a restoration unit that restores the active state information of each of said plurality of serving cells based on said transmission sequence that was received, wherein said restoration unit includes:

a conversion unit that converts candidates of active state information of each of said plurality of serving cells to cyclic shift amounts;

a reverse cyclic shift unit that, by carrying out reverse cyclic shifting of said transmission sequence in accordance with said cyclic shift amounts that were converted, generates candidates of said transmission data that were connected;

a CRC checking unit that carries out CRC checking of candidates of said transmission data that were connected; and an information control unit that sequentially changes candidates of active state information of each of said plurality of serving cells such that said CRC checking results become correct and that takes the candidate of active state information of each of said plurality of serving cells when said CRC checking result is correct as the active state information of each of said plurality of serving cells that were restored; and a separation unit that, based on active state information of each of said plurality of serving cells that were restored, separates transmission data of each of said plurality of serving cells from said transmission data that were connected, wherein said separation unit, based on said active state information of each of said plurality of serving cells that were restored, separates transmission data of each of said plurality of serving cells from the candidate of connected transmission data at the time said CRC checking result was correct, and provides said separated transmission data at the transmission data output.

3. A transmission method realized by a transmission device and comprising:

connecting transmission data of each of a plurality of serving cells;

adding active state information that indicates whether the state of each of said plurality of serving cells is the active state to said transmission data that were connected to generate a transmission sequence; and transmitting said generated transmission, wherein said adding step comprises:

converting active state information of each of said plurality of serving cells to a cyclic shift amount, and carrying out cyclic shifting of said transmission data that were connected in accordance with said cyclic shift amount from the converting active state information step.

4. The transmission device of claim 1, wherein, the transmission device is a mobile station, and the transmission data is CQI/PMI of each of the plurality of serving cells.

5. The reception device of claim 2, wherein, the reception device is a base station, and the separated transmission data is CQI/PMI of each of the plurality of serving cells.

* * * * *